United States Patent [19]

Prager et al.

[11] Patent Number: 5,726,915
[45] Date of Patent: Mar. 10, 1998

[54] AUTOMATED SYSTEM FOR TESTING AN IMAGING SENSOR

[75] Inventors: Kenneth E. Prager, Folsom; Robby Mauri, Hawthorne, both of Calif.

[73] Assignee: Hughes Aircraft Company, Los Angeles, Calif.

[21] Appl. No.: 543,954

[22] Filed: Oct. 17, 1995

[51] Int. Cl.$^6$ ............................ G05B 23/02; H04N 17/00
[52] U.S. Cl. ..................... 364/553; 364/579; 364/525; 348/187; 348/189
[58] Field of Search ........................... 364/553, 579, 364/525, 550, 551.01, 571.07; 358/10, 139; 348/187, 189; 382/18, 34, 51, 53, 54

[56] References Cited

U.S. PATENT DOCUMENTS

| | | | |
|---|---|---|---|
| 4,295,128 | 10/1981 | Hashemian et al. | 340/506 |
| 4,343,021 | 8/1982 | Frame | 358/213 |
| 4,692,299 | 9/1987 | Crew et al. | 376/216 |
| 4,873,655 | 10/1989 | Kondraske | 364/553 |
| 5,033,015 | 7/1991 | Zwirn | 364/579 |
| 5,151,682 | 9/1992 | Marinitsch | 340/514 |

OTHER PUBLICATIONS

An Automatic Tester Which Performs Objective Measurement on Imaging Sensor Systems Robert Zwirn/Kenneth Prager.

*Primary Examiner*—Emanuel T. Voeltz
*Assistant Examiner*—Hein Vo
*Attorney, Agent, or Firm*—Gordon R. Lindeen, III; Michael W. Sales; Wanda K. Denson-Low

[57] ABSTRACT

An automated system and method for testing a sensor by evaluating the output thereof with respect to a known target. The advantageous method includes the step of acquiring an output signal from the sensor in response to a known target, said output including signature signal S, random noise $N_R$ and fixed pattern noise $N_{FP}$. Next, the sensor output signal is processed to provide a first signal which includes essentially signature signal S and fixed pattern noise $N_{FP}$, a second signal which includes essentially random noise $N_R$ and a third signal which includes essentially fixed pattern noise $N_{FP}$. The third signal is adaptively filtered to provide a filtered signal fixed pattern noise signal $N'_{FP}$. The filtered signal $N'_{FP}$ is subtracted from the first signal to extract a signature S. In a particular embodiment, the signature is processed to acquire a modulation transfer function and a signal peak baseline therefrom. The modulation transfer function, signal peak baseline and random noise signals are processed to acquire a minimum resolvable temperature of said sensor.

20 Claims, 8 Drawing Sheets

FIG. 14

AUTOMATED SYSTEM FOR TESTING AN IMAGING SENSOR

BACKGROUND OF THE INVENTION

1. Field of the Invention

The present invention relates to automated testing systems. More specifically, the present invention relates to automated systems for testing imaging sensors to qualify sensor performance with respect to minimum resolvable signatures.

While the present invention is described herein with reference to a particular embodiment for an illustrative application, it is understood that the invention is not limited thereto. Those having ordinary skill in the art and access to the teachings provided herein will recognize additional modifications, applications and embodiments within the scope thereof.

2. Description of the Related Art

It was common practice at one time to use human observers to rate, evaluate and otherwise determine if an imaging sensor met certain specifications. Unfortunately, the use of human observer had several drawbacks. For example, in most cases, the human observer had to be specially trained. This training was generally both time consuming and costly. In addition, human observers varied, even after such special training, in the determination of acceptable output for the sensor under test. The lack of repeatability of human perception of sensor output for both an individual human observer and between groups of human observers often increased the improper rating of imaging sensors. Also, inasmuch as imaging sensors were evaluated via subjective visual displays, it was often difficult to determine if the output from an imaging sersor met objective specifications.

Applications for imaging sensors include infrared systems used by ground and airborn military personnel, radar systems for aircraft detection and navigation, and television systems for visual monitoring. Each application may impose a different set of requirements on the imaging sensor. Under these circumstances, when human observers were employed to test the sensors, it was often difficult to obtain an appropriate standard by which to measure sensor outputs.

In some cases, the standard by which the sensors were measured were based on the perception of some specific group of observers over a given sample or time period. Unfortunately, as human observers varied from day-to-day in their ability to properly evaluate a sensor, some sensors were deemed acceptable, under such a standard, when the sensor was faulty and vice versa.

In addition to the fact that the human determination of sensor acceptability could be time consuming, many adverse consequences were known to follow from an improper evaluation of a sensor. Acceptable sensors thought to be faulty were costly to replace or repair. The identification and replacement of an improperly passed sensor by an end user was costly as well. Additional expenses were incurred in shipping, receiving, evaluating and reshipping such sensors.

Further, a human rating of an imaging sensor was typically performed only when the sensor assembly was completed such that a visual output was obtained. This late testing of sensors was problematic in that faults could not be detected early in the assembly of the sensor. Problems found in completed sensor assemblies were typically much more costly to correct than those discovered in subassemblies prior to integration. That is, faulty components were not replaced and improper assembly was often not corrected prior to completion of the sensor assembly.

There was therefore a need in the art for a test system or method for accurately and repeatably determining the acceptability of sensor outputs rapidly and early in the manufacturing cycle. This need was met by U.S. Pat. No. 5,033,015, entitled AUTOMATED SYSTEM FOR TESTING AN IMAGING SENSOR, issued Jul. 16, 1991, to R. Zwirn, the teachings of which are incorporated herein by reference.

This patent discloses and claims an automated system for testing imaging sensors which includes input circuitry for receiving input from an imaging sensor system and providing a signal in response thereto, a processor for operating on the signal and generating data therefrom, and a lookup table for providing output in response to the data. A specific teaching of the reference provides a method for obtaining data for the lookup and calculating addresses for the data wherein the addresses are a function of the signal and noise components of the imaging sensor system output, while the data relates to actual responses of human observers.

While this system substantially met the need in the art at the time, current applications have created new needs. For example, the noise sensitivity of the referenced system is such that it does not provide a satisfactory measure of the modulation transfer function (MTF), the frequency response of the system. This is due to the fact that the referenced system merely subtracted the fixed pattern or correlated noise from the received signal.

As this approach does not yield a satisfactory signal to noise ratio, a need remains in the art for a system and technique for accurately and repeatably determining the acceptability of sensor outputs which removes correlated noise with minimal diminution of a desired signal.

SUMMARY OF THE INVENTION

The need in the art is addressed by the present invention which provides an automated system and method for testing a sensor by evaluating the output thereof with respect to a known target. This advantageous method includes the step of acquiring an output signal from the sensor in response to a known target, the output including signature signal S, random noise $N_R$ and correlated or fixed pattern noise $N_{FP}$. Next, the sensor output signal is processed to provide a first signal which includes essentially signature signal S and fixed pattern noise $N_{FP}$, a second signal which includes essentially random noise $N_R$ and a third signal which includes essentially correlated noise $N_C$. The third signal is adaptively subtracted from the first signal to extract a signature S.

In a particular embodiment, the signature is processed to acquire a modulation transfer function and a signal peak baseline therefrom. The modulation transfer function, signal peak baseline and random noise signals are processed to acquire a minimum resolvable temperature of the sensor. The step of processing the sensor output signal to provide first, second and third signals includes the step of setting the target to present a temperature differential to the sensor and calculating the second signal in response thereto. The step of calculating the second signal includes the steps of averaging multiple frames of output signals to acquire the first signal and subtracting the first signal from the sensor output signal to acquire the second signal. The step of processing the sensor output signal to provide first, second and third signals includes the step of setting the target to present a zero degree temperature differential and calculating the third signal in response thereto. The step of calculating the third signal includes the step of averaging multiple frames of output signals to acquire the first signal.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

The teachings of the present invention are best illustrated with respect to the testing of an infrared (IR) sensor. As is well known in the art, the key test for a sensor is the extent to which it can measure a temperature differential as a function of spatial frequency. This parameter is known as the 'minimum resolvable temperature differential' or simply 'MRT'. MRT is commonly performed on infrared sensors during engineering development and production test. A widely accepted definition of MRT is the temperature difference at which an observer can resolve all four bars of a four-bar target.

An MRT test is generally performed using a set of four-bar targets, each of different spatial frequency. A two-step procedure is used for each target: the observer adjusts the temperature difference (between the four-bar target and the temperature source background) until the MRT criterion has been met and the temperature difference is recorded. This is repeated for the opposite polarity and the two partial results are averaged together, yielding one MRT point. There have been several attempts to automate the MRT test. (See for example, M. J. Boyd and A. G. Sutton, "An approach to automatic FLIR video assessment," *IEEE Transactions on Instrumentation and Measurement*, vol. IM-33, no. 4, pp. 322–327, 1984; T. L. Williams, "Results of some preliminary work on objective MRTD measurement," *SPIE*, vol. 549, 1985; W. L. McCracken, "Objective MRTD as a figure of merit," *SPIE*, vol. 892, 1988; and A. N. de Jong and S. J. M. Bakker, "Fast and objective MRTD measurement," TNO Physics and Electronics Laboratory, Rep. FEL 1988–24, 1988. Most of these methods use a mathematical model for MRT (for example, see J. M. Lloyd, *Thermal Imaging Systems*. New York, N.Y.: Plenum Press, 1975), which include the sensor MTF and NET, as well as a host of other parameters. These other parameters are usually combined into a single parameter, κ, which are then approximated to be constant for each spatial frequency. Thus, the MRT model becomes a function of the constant, the Noise Equivalent Temperature (NET) and the Modulation Transfer Function (MTF). For example, $$MRT(f) = \kappa(f) \frac{NET}{MTF(f)} \quad [1]$$

The method presented here does not compute how the observers theoretically should have performed. The observers are calibrated using only data from the sensor output. These data are, in effect, the system signature. During production testing of the sensor, the system signature is used to retrieve the correct observer response for all specified spatial frequencies. Perceptual variations are suppressed by exploiting the statistics of the observers.

In accordance with the present teachings, MRT is described as a function of the displayed system parameters. Rather than attempt to model the complete IR system, the problem is approached from the point of view of the displayed information. That is, what information is presented to the observer and how do changes in this information affect the observer's prediction of MRT? This function is then separated into several components and relationships among these components are developed.

MRT is a nonlinear function of the system modulation transfer function (MTF), responsivity, noise and observer requirements. In the proposed method, the system MTF is calculated using traditional means, such as the Discrete Fourier Transform (DFT). The system responsivity, Σ, is measured by summing the peaks and valleys of the electrical waveform which results when viewing a four-bar target. The system noise is separated into two parts, time-random ($N_R$) and time-correlated ($N_{FP}$), both measured in terms of the display. Finally, the observer requirements, O, are described by a probability density and include the effects of the human psycho-visual system and variations between different observers. Thus, the MRT of a system, at spatial frequency, f, can be described by a five-dimensional look-up table, $$MRT = g_f(MTF, \Sigma, N_R, N_C, O). \quad [2]$$

The correlated noise term includes the effects of degradations such as multiplexer noise, dead and noisy channels, and gain and level non-uniformities. The exact effect of these degradations on MRT is still an active area of research. For now, $N_{FP}$ can be removed from (2), if a separate screening procedure for excessive correlated noise is applied.

As is well known in the art, the temperature differential between a black body radiating source and a target plate, $\Delta T$, is linearly related to the responsivity and random noise, that is $$\frac{\Sigma}{N_R} = \alpha^2 \Delta T \qquad [3]$$

Thus, (2) can be rewritten as a combination of some function ($g_f$) of MTF and O and a linear function (I) of $\Sigma$ and $N_R$:

$$MRT(f) = g_f(MTF,O)I(\Sigma,N_R)$$

Where $I(\Sigma, N_R)$ is $$I(\Sigma,N) = \frac{1}{\alpha} = \Delta T \frac{N}{\Sigma} = NET \qquad [5]$$

Changes in the electrical and optical frequency response have no effect on $I(\Sigma, N)$, as it is orthogonal to $g_f(MTF,O)$. However, changes in the frequency response are reflected by the MTF measurement and thus $g_f(MTF, O)$.

If $\Sigma/N$ is measured when an observer declares MRT, then equation [3] can be written as $$\frac{\Sigma}{N_R} = \alpha MRT(f) \qquad [6]$$

Substituting [4] into [6] and recalling that $I(\Sigma,N)=1/\alpha$, a look-up table can be constructed by plotting against $g_f(MTF, O)$, that is $$\frac{\Sigma}{N_R} = g_f(MTF,O) \qquad [7]$$

Then, writing [4] in terms of [5] and [7] yields $$MRT(f) = \frac{g_f(MTF,O)}{\alpha} \qquad [8]$$

If $\Sigma/N_R$ measured for any known $\Delta T$, the $\Delta T$ corresponding to some other $\Sigma/N_R$ be calculated as the relationship in [3] is linear. For example, if $\Sigma_M/N_{R,M}$ are the measured values when the temperature difference is set to $\Delta T_{BB}$, then the slope, $\alpha$, is equal to $$\alpha = \Sigma_M/\Delta T_{BB}. \qquad [9]$$

Therefore, substituting [9] into [8] gives $$MRT(f) = (N_{R,M} \Delta T_{BB}/\Sigma_M) g_f(MTF,O). \qquad [10]$$

Equation [10] is the basis for AMRT. The operator response (O) for a family of sensors with a characteristic signature (MTF) is stored in a look-up table when MRT is declared during look-up table generation. For production test, the system signature is used to access the look-up table and retrieve the actual operator response. The MRT for all spatial frequencies of interest can be measured at one temperature because of the linearity of [9] and the fact that measurement of MTF is independent of temperature.

Figure 1:
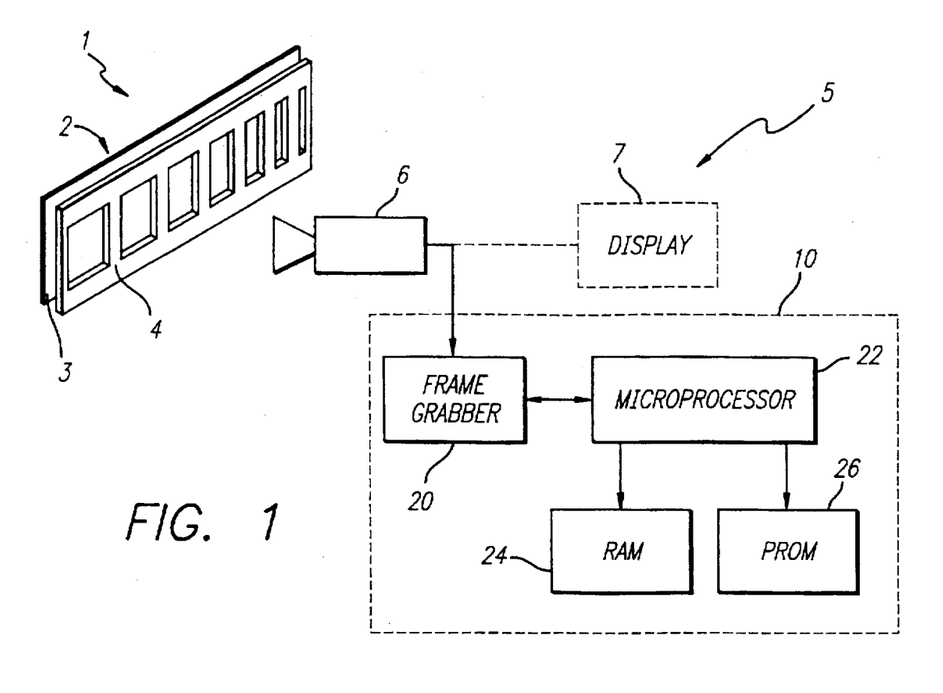
FIG. 1 is a test setup for an infrared sensor.

A test setup 1 for an infrared sensor is shown in FIG. 1. The target 2 includes a black body radiating source 3 which is at one temperature and target plate 4 with a single aperture at a second temperature. The desired test frequencies for the sensor system 5 can be derived from the width of the aperture. In FIG. 1, the target plate 4 provides a variable spatial frequency bar target. Those skilled in the art will appreciate that the present invention is not limited to the type of sensor or target used.

In FIG. 1, the sensor system 5 includes an infrared sensor 6. In the preferred embodiment, the sensor 6 is a drivers thermal viewer (DTV). The sensor system 5 may also include a display 7 (shown in phantom). The sensor 6 views the target 2 and provides an output which may be input directly to the automated system 10 of the present invention or via a scanning of the output of the display 7. It will be appreciated by those skilled in the art that the output of the imaging sensor system may be either analog or digital without departing from the scope of the present invention.

The system 10 includes a frame grabber 20, a microprocessor 22, a random access memory 24 and a programmable read-only memory 26. The microprocessor 22 executes the method set forth herein as it is embodied in code stored in the PROM 26. Interim data products generated are stored in the RAM 24.

Figure 2A:
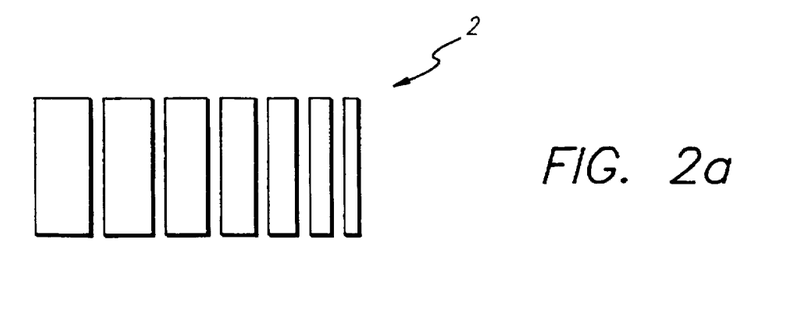
FIG. 2a is a frontal view of the variable frequency bar target of the test setup of FIG. 1.
Figure 2B:
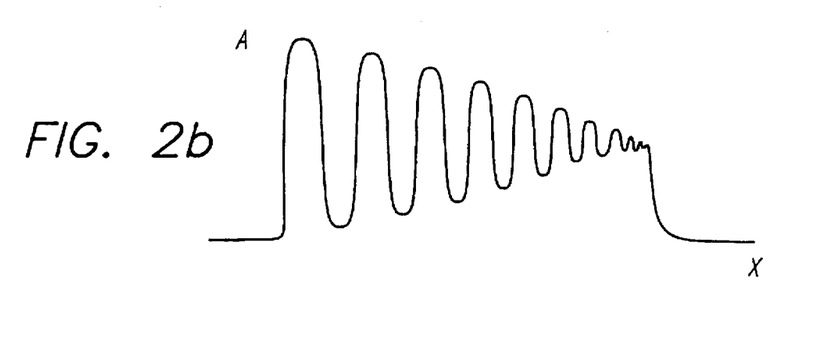
FIG. 2b illustrates the output of the sensor of FIG. 1 in response to the black body radiating source as viewed through the variable frequency bar target provided by the target plate.

FIG. 2a is a frontal view of the single aperture target, also known as a NETD target. FIG. 2b illustrates the output of the sensor 6 in response to the black body radiating source 3 as viewed through the NETD target provided by the target plate 4. FIG. 2b is idealized.

Figures 3, 4:
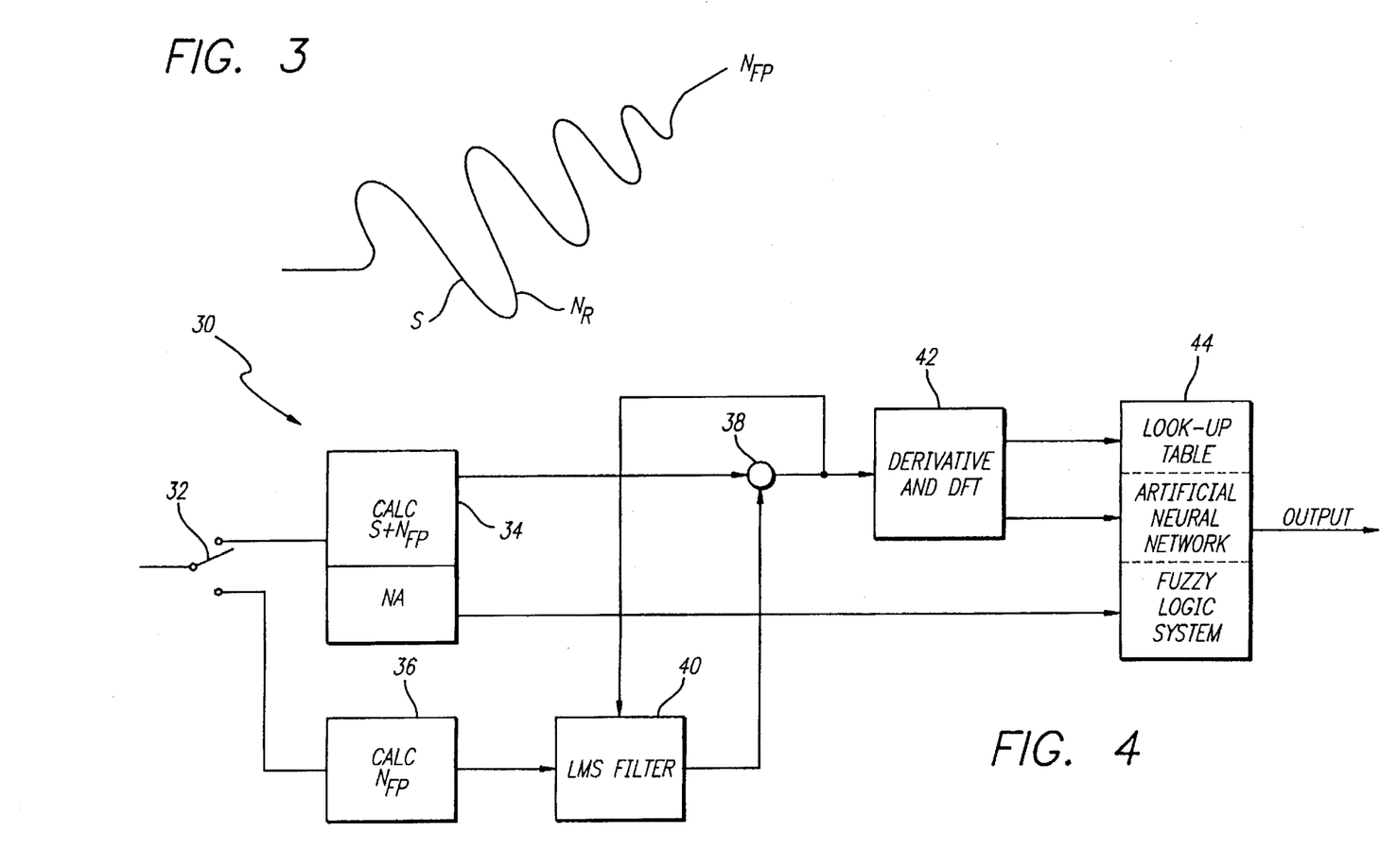
FIG. 3 is a more realistic depiction of the output of the sensor as a function of spatial frequency.
FIG. 4 is a simplified block diagram of an automated system for testing a sensor system in accordance with the present teachings.

FIG. 3 is a more realistic depiction of the output of the sensor as a function of spatial frequency. FIG. 3 shows an asymptotic signal S on which random noise $N_R$ is superimposed along with correlated fixed pattern noise $N_{FP}$. The fixed pattern noise manifests as DC drift. In equation form:

$$A(x) = S + N_R + N_{FP} \qquad [11]$$

In accordance with the teachings of the present invention as set forth more fully below, the random noise is eliminated by averaging successive frames of image data yielding:

$$A(x) = S + N_{FP} \qquad [12]$$

Then, subtracting equation [11] from [12] yields the random noise $N_R$. As set forth more fully below, the random noise is stored in a histogram whose output yields a figure of merit for noise which is used to generate the minimum resolvable temperature for the sensor. This is depicted in FIG. 4.

Hence, relative to the above-referenced Zwirn patent, the present invention offers 1) improvements in fixed-pattern noise measurement, 2) improvements in sensor MTF measurements, and 3) a reformulation using artificial neural network (ANN) or fuzzy logic concepts. As discussed more fully below, the improvements in fixed-pattern noise measurements result from the use of a least means squares (LMS) adaptive filter algorithm. The LMS filter is used to adaptively subtract a waveform containing only correlated noise from a waveform containing signal plus correlated noise. The result is a waveform containing only signal.

The improvements in sensor MTF measurements derive from the use of Discrete Fourier Transform (DFT) of the derivative of a signal obtained when viewing either a 4-bar or square blackbody target. The present method affords improvements in accuracy and noise performance.

FIG. 4 is a simplified operational block diagram of the method 30 for testing a sensor system in accordance with the present teachings. The method 30 includes the step 34 of calculating S, $N_R$ and $N_{FP}$ and the step 36 of calculating $N_{FP}$. Data from the sensor is directed by a switch 32 between steps 34 and 36. From step 34, the signal and fixed-pattern noise are input to the a subtractor 38. The random noise component from step 34 is input to a lookup table 44 directly. The fixed pattern noise $N_{FP}$ is input to an LMS filter 40. The output of the LMS filter $N'_{FP}$ is adaptively adjusted so that when subtracted from $S+N_{FP}$, S is maximized. The signal component S is then used to calculate the system responsivity, Σ, and a differentiated and a discrete Fourier Transform is performed (step 42) to generate the modulation transfer function (MTF). These quantities are fed into the lookup table 44, the output of which is the AMRT of the sensor under test.

Figure 5:
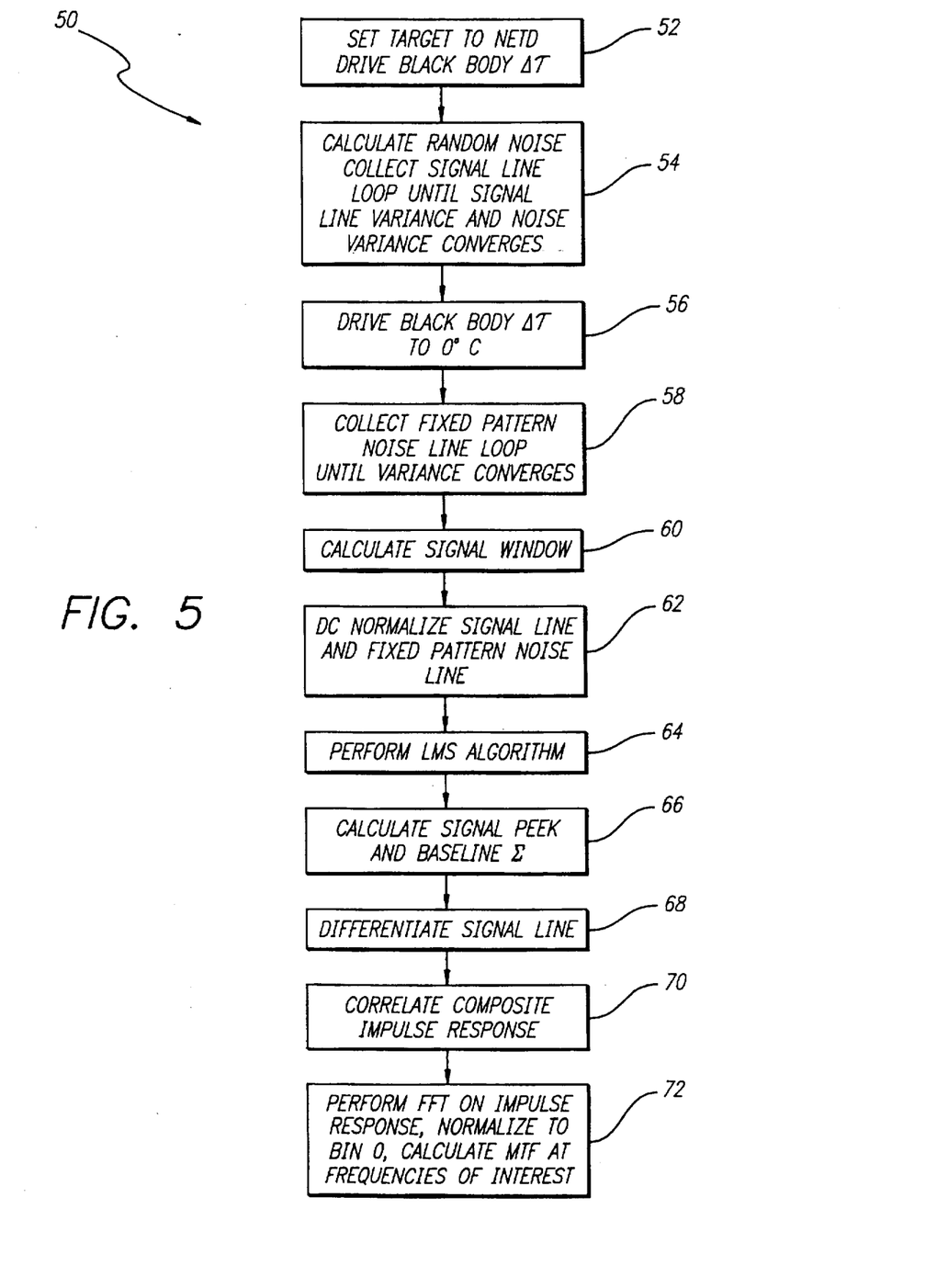
FIG. 5 is a flow diagram of the average minimum resolvable temperature method of the present invention.
Figure 6:
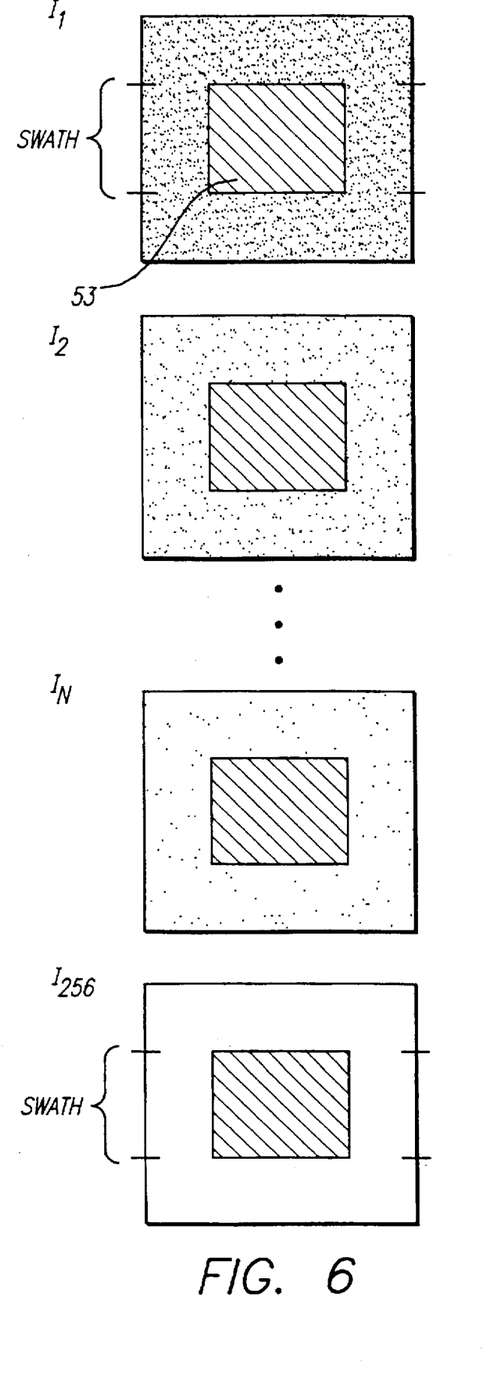
FIG. 6 illustrates a noise equivalent temperature difference (NETD) target.
Figure 7:
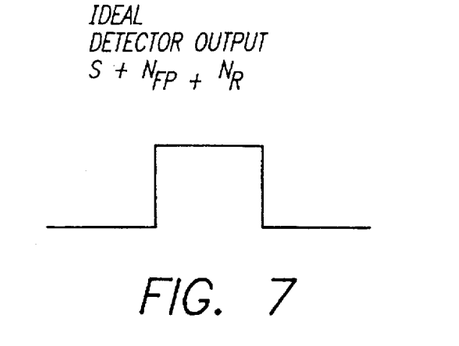
FIG. 7 illustrates ideal detector output over a swath cut through the NETD target.

FIG. 5 is an operational block diagram of the average minimum resolvable temperature method of the present invention. As shown in the diagram 50, the method includes the step of selecting the NETD (noise equivalent temperature difference) target 2. An NETD target 53 is simply a square target as illustrated in FIG. 6. The target is typically contained in an external target wheel which is computer or manually controlled. The ideal detector output over a swath cut through the NETD target is shown in FIG. 7. However, a more realistic representation of the detector output over a swath cut through the NETD target is shown in FIG. 8.

Figure 8:
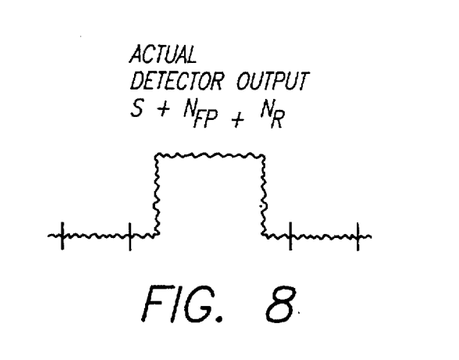
FIG. 8 illustrates a more realistic representation of a detector output over a swath cut through the NETD target.

FIG. 8 shows the signal S with fixed pattern and random noise $N_{FP}$ and $N_R$ components of the sensor.

Returning to FIG. 5, in accordance with the system and method of the present invention, the random noise is measured, calculated and eliminated over a sequence of steps until the signal line variance and the noise variance converges. This step is shown in greater detail in FIG. 9.

Figure 9:
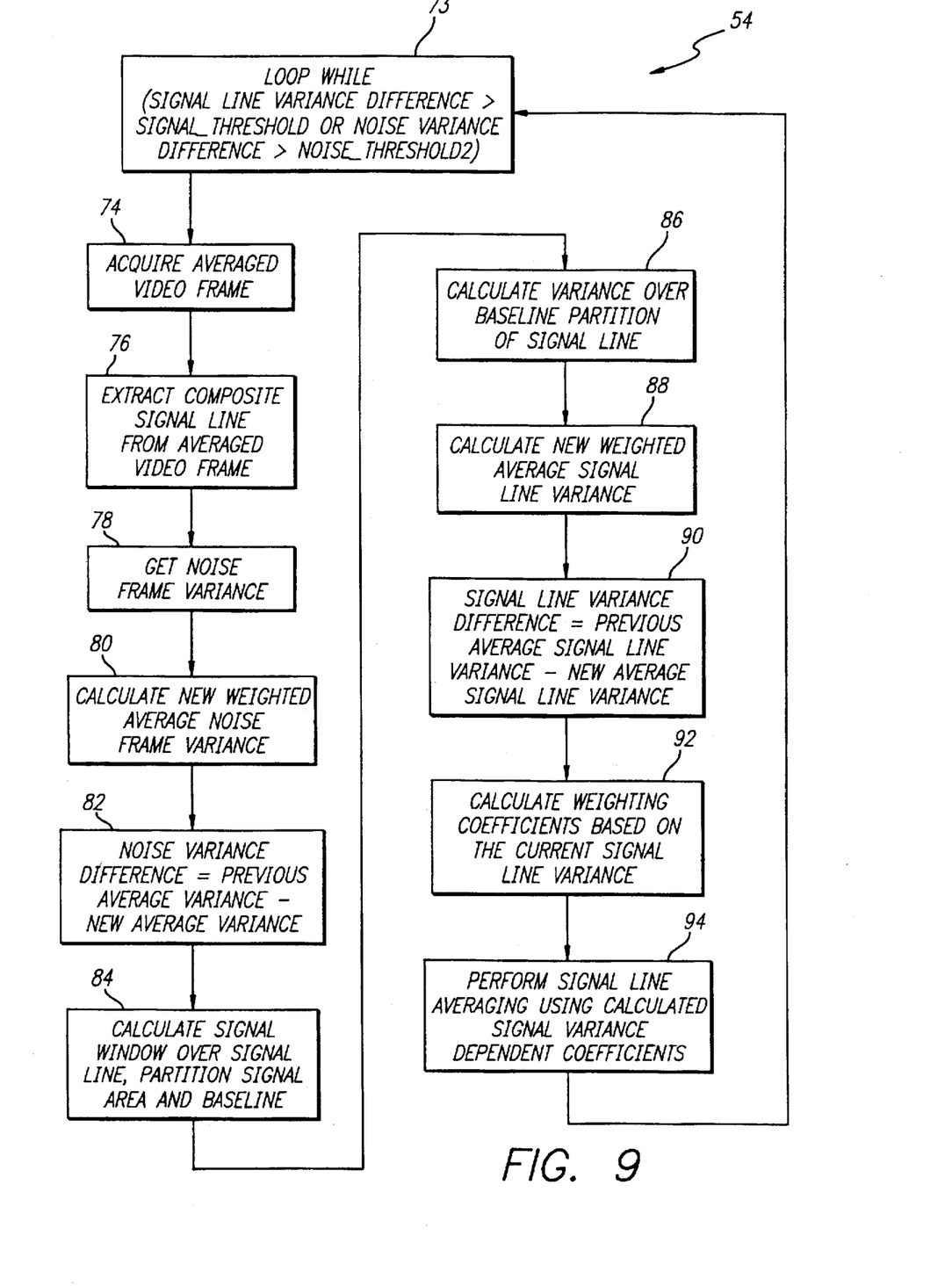
FIG. 9 shows the signal line and noise acquisition process of the present invention.

FIG. 9 shows the signal line and noise acquisition process of the present invention. In accordance with the process 54, at step 73, the microprocessor 22 determines if the signal line variance difference is greater than a signal threshold or if the noise variance difference is greater than a noise threshold. If either difference is greater than the associated threshold, the system continues to loop. The system begins each loop at step 74 by averaging multiple (e.g. 256) frames of video to acquire an averaged frame. In this averaged frame, much of the random noise $N_R$ is eliminated leaving the signal S and the fixed pattern noise $N_{FP}$ as illustrated in FIG. 10.

Figure 10:
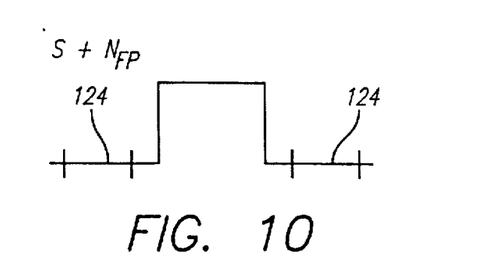
FIG. 10 shows the signal S with fixed pattern noise $N_{FP}$ components of the sensor output after the random noise has been eliminated by repeated averaging steps in accordance with the teachings of the present invention.

FIG. 10 shows the signal S with fixed pattern noise $N_{FP}$ components of the sensor output after the random noise has been eliminated by repeated averaging steps as set forth below.

Returning to FIG. 9, at step 76, the composite signal line is extracted by filtering the $S+N_{FP}$, signal. The result is mostly signal S. At step 78, the noise frame variance is acquired.

Figure 11:
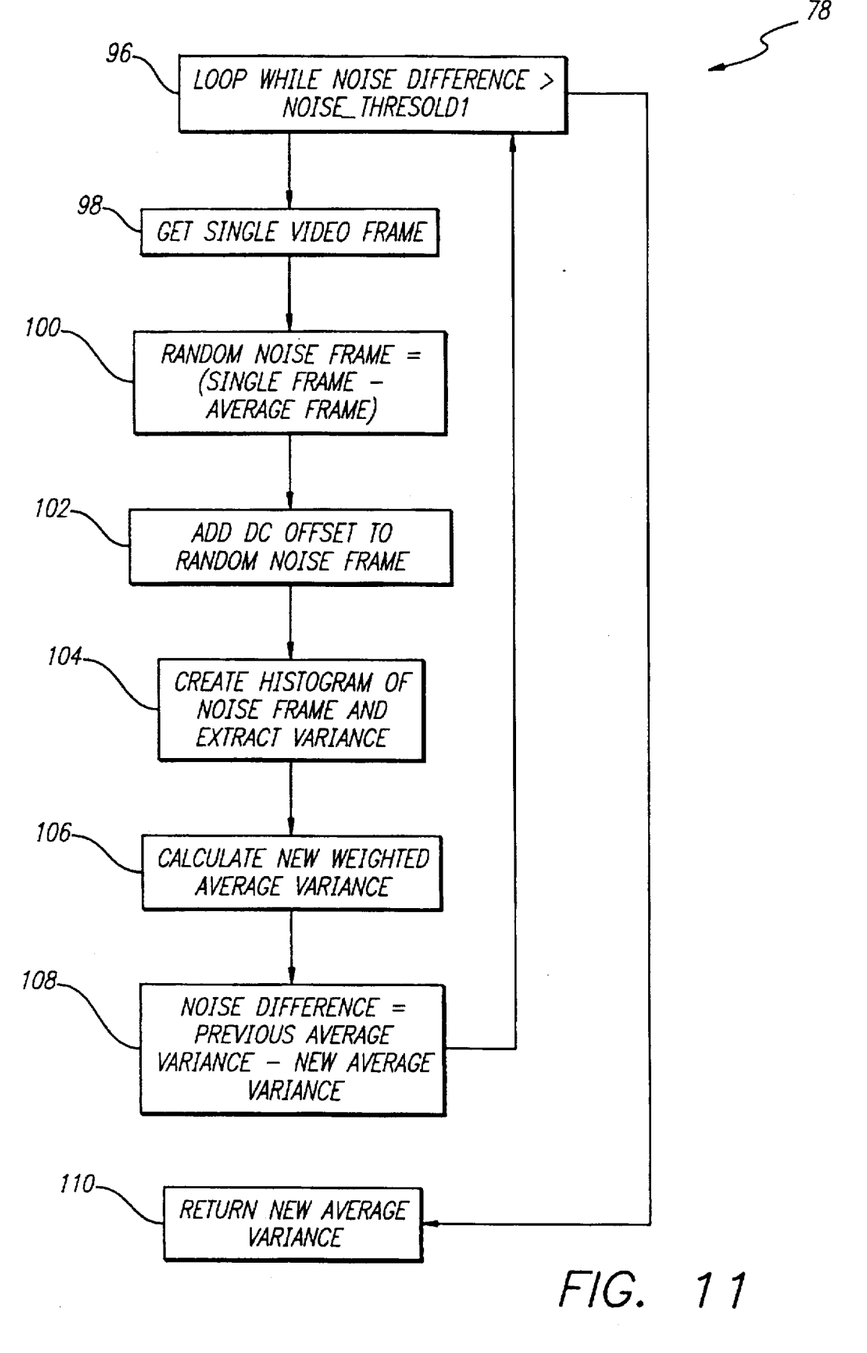
FIG. 11 shows a method for acquiring noise frame variance in accordance with the teachings of the present invention.

FIG. 11 shows a method for acquiring noise frame variance in accordance with the teachings of the present invention. The microprocessor 22 loops while the noise difference is greater than a noise threshold. At step 98, the system acquires a single video frame. At step 100, the averaged frame consisting of the signal S with fixed pattern noise $N_{FP}$ components of the sensor output (FIG. 10) is subtracted from the single frame consisting of the signal S with fixed pattern and random noise $N_{FP}$ and $N_R$ components of the sensor output (FIG. 8). The result is the noise frame consisting essentially of random noise $N_R$. At step 102, a dc offset is added to the random noise frame. At step 104, a histogram of the noise frame is created to extract the variance, referred to as $N_R$.

Figure 12:
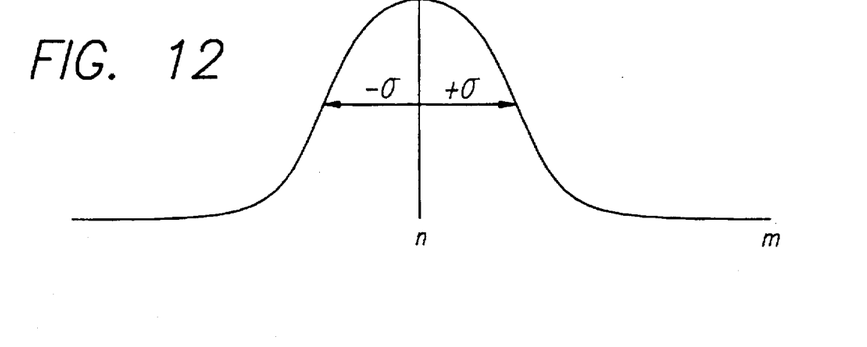
FIG. 12 illustrates a histogram of the noise frame constructed in accordance with the teachings of the present invention.

FIG. 12 illustrates a histogram of the noise frame constructed in accordance with the teachings of the present invention.

Figure 13:
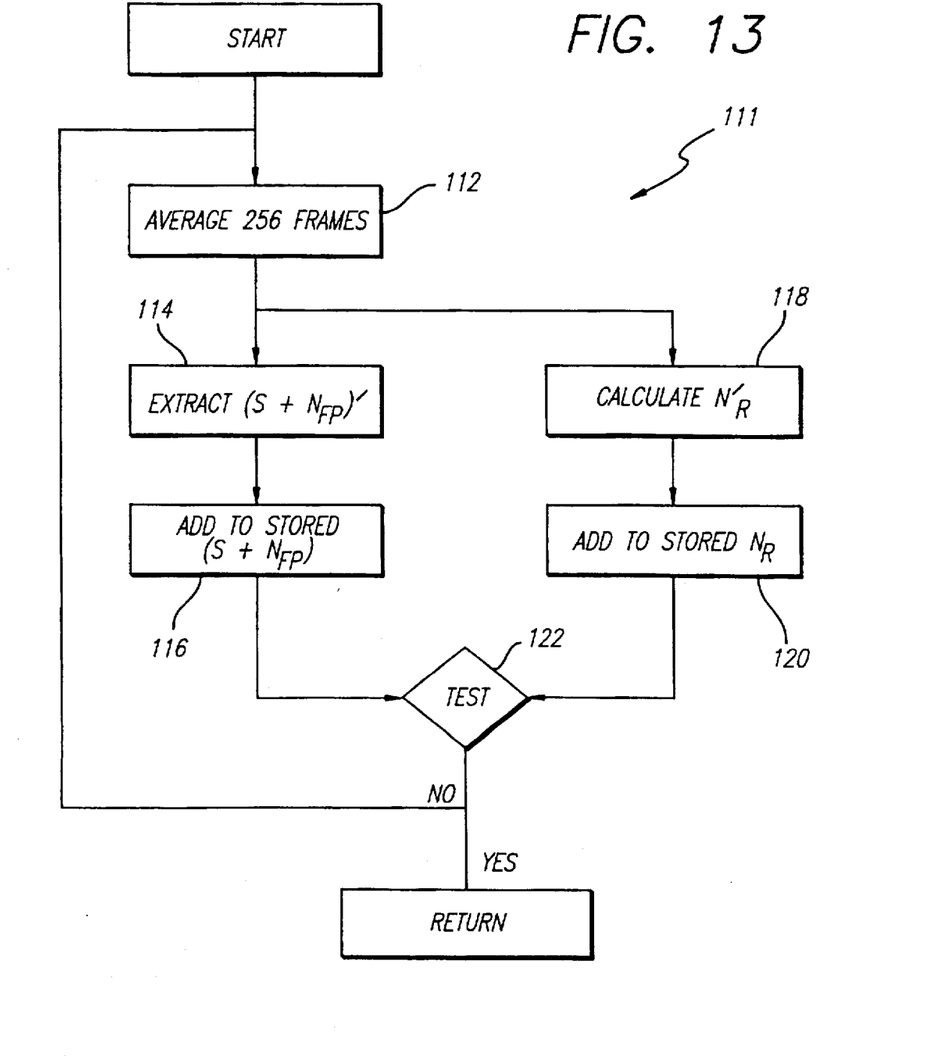
FIG. 13 depicts the method for averaging the signal, fixed pattern noise, and random noise signal components to the point of convergence in accordance with the present teachings.

FIG. 13 illustrates how a composite average of S and $N_{FP}$ is created from individual averages of S and $N_{FP}$ and how a composite average of the noise variance, $N_R$ is created from individual measurements of $N_R$.

If $$M=(S+N_{FP}) \quad [13]$$

and $$M'=(S+N_{FP})', \quad [14]$$

where M represents a composite average of signal S with fixed pattern noise $N_{FP}$ and M' represents an individual sample of averaged signal with fixed pattern noise, then $$M = \left( \sum_{0}^{N-1} M' \right) /N \quad [15]$$

and for the random noise:

$$N'_R = \left( \sum_{0}^{N-1} N''_R \right) /N \quad [16]$$

and $$N_R = \left( \sum_{0}^{m-1} N'_R \right) /M \quad [17]$$

This routine is depicted in FIG. 13. At step 122, the routine 111 tests M and $N_R$ against a stored stopping criteria and loops until the criteria is met.

Returning to FIG. 11, at step 106, a new weighted average variance is calculated. In accordance with conventional statistical theory, the average variance σ is the distance between the mean or average value η of the histogram and the edge of the histogram at the midline thereof.

At step 108, the noise difference $N_D$ is calculated as follows:

$$N_D=N_R-N_R \quad [18]$$

At step 96, the routine 78 checks to see if the noise difference $N_D$ is greater than a noise threshold, if so, it loops, if not, at step 110, the routine 78 returns the new average variance $N_R$.

Returning to FIG. 9, at step 80, the system calculates a new weighted average noise frame variance. At step 82, a noise variance difference is calculated.

In a similar manner, steps 82–90 calculate a signal line variance difference over a baseline portion 124 of the signal line, see FIG. 10. At step 92, weighting coefficients are calculated based on the current signal line variance. At step 94, the signal line is averaged using calculated signal variance dependent coefficients. At step 73, this routine 54 loops while the signal line variance difference exceeds a signal threshold or while a noise variance difference exceeds a noise threshold.

Returning to FIG. 5, at step 56, the temperature differential of the target 2 of FIG. 1 is driven to 0° Centigrade. At step 58, the fixed pattern noise is collected after the variance thereof converges due to repeated averaging thereof. This is depicted in FIG. 14.

Figure 14:
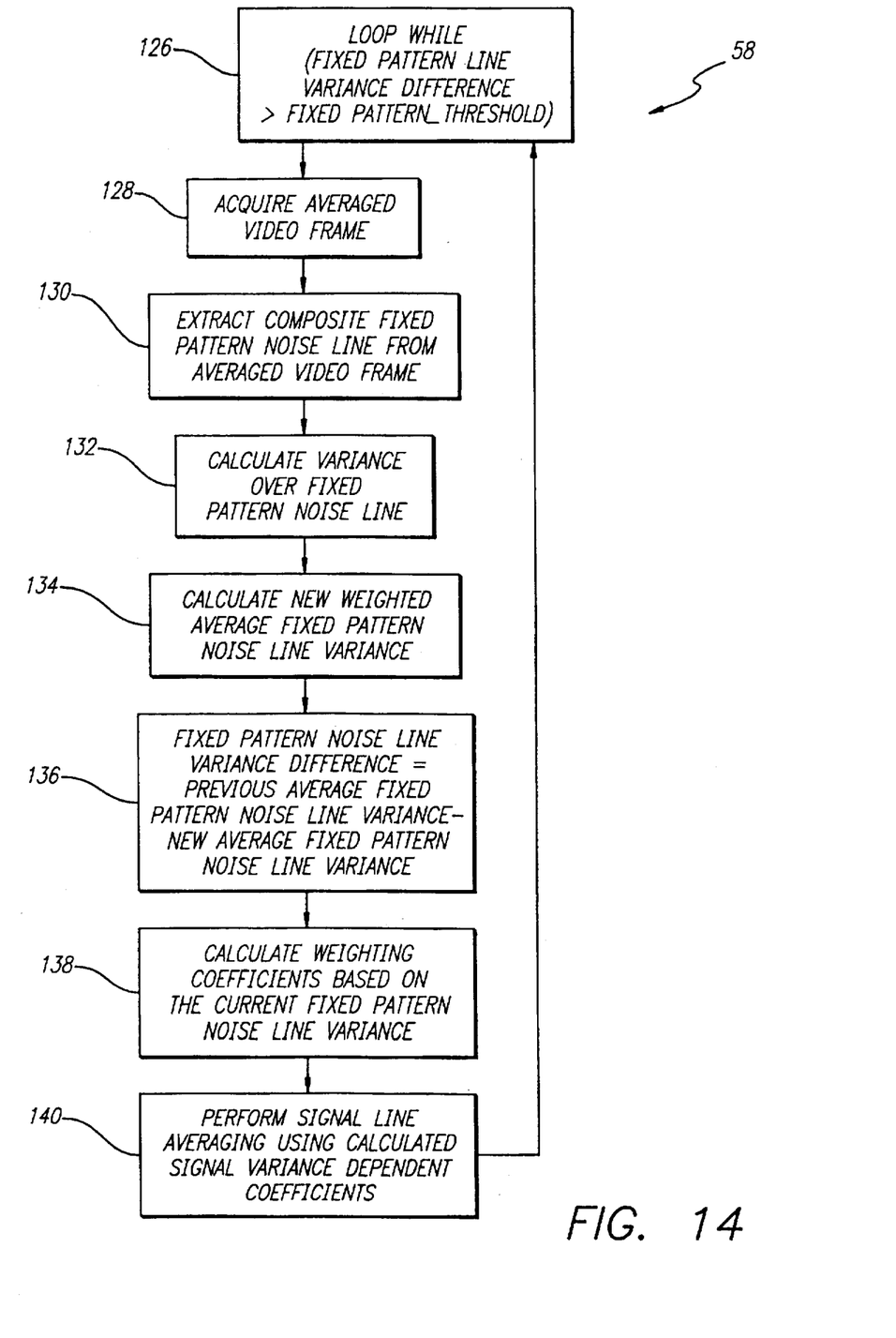
FIG. 14 is a block diagram of the fixed pattern noise line acquisition process of the present invention.

FIG. 14 is a block diagram of the fixed pattern noise line acquisition process of the present invention. Steps 128 and 130 are identical to steps 74 and 76 of FIG. 9. At step 132, the variance is calculated over the fixed pattern noise line. The fixed pattern noise line is acquired by subtracting the stored signal line (FIG. 10) from the average signal plus fixed pattern noise line. The variance is calculated in a manner similar to that used to calculate the random noise frame variance as set forth above. Steps 136–140 and 126 are similar to steps 90–94 and 73 of FIG. 9.

Returning to FIG. 5, at steps 60 and 62, a signal window is calculated and the signal line and the fixed pattern noise line are DC normalized.

A significant feature of the invention is that at step 64, a least means squares (LMS) algorithm is performed on the fixed pattern noise line. As illustrated in FIG. 4, this algorithm 40 adaptively adjusts the value of the fixed pattern noise signal $N_{FP}$ so that when it is subtracted from the signal plus fixed pattern noise (S+$N_{FP}$), the signal component S is maximized.

Returning to FIG. 5, at step 66 the signal peak and baseline are used to calculate Σ. At steps 68-70, the signal line is differentiated and an impulse response is correlated in a conventional manner. At step 72, a Fast Fourier Transform (FFT) is performed on the impulse response. The magnitude of the FFT operation is normalized to be equal to owe at bin 0 and the modulation transfer function (MTF) is extended for frequencies of interest.

As illustrated in FIG. 4, the microprocessor 22 of FIG. 1 inputs the modulation transfer function, the system responsibility Σ, and the random noise value to a lookup table of statistical responses based on actual observer data, an artificial neural network, a fuzzy logic system or other tool 44 to output the minimum resolvable temperature of the sensor under test.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

What is claimed is:

1. An automated system for testing a sensor by evaluating the output thereof with respect to a known target, said automated system comprising:
   means for acquiring an output signal from the sensor in response to a known target, said sensor output including a signature signal S, random noise $N_R$ and fixed pattern noise $N_{FP}$;
   means for processing the sensor output signal to provide a first signal which includes essentially signal S and fixed pattern noise $N_{FP}$, a second signal which includes essentially random noise $N_R$ and a third signal which includes essentially fixed pattern noise $N_{FP}$;
   means for adaptively filtering said third signal to provide a filtered signal fixed pattern noise signal $N'_{FP}$; and
   means for subtracting said filtered signal $N'_{FP}$ from the first signal to extract said signature S.

2. The invention of claim 1 further including means for processing said signature signal to acquire a modulation transfer function and a signal peak baseline therefrom.

3. The invention of claim 2 further including means for processing the modulation transfer function, signal peak baseline and random noise signals to acquire a minimum resolvable temperature of said sensor.

4. The invention of claim 2 wherein the means for processing the sensor output signal to provide first, second and third signals includes means for calculating the second signal in response to a temperature differential at said target.

5. The invention of claim 4 wherein the means for calculating the second signal includes the means for averaging multiple frames of output signals to acquire the of output signals to acquire the first signal and subtracting the first signal from the sensor output signal to acquire the second signal.

6. The invention of claim 2 wherein the means for processing the sensor output signal to provide first, second the third signals includes the means for setting the target to present a zero degree temperature differential and calculating said third signal in response thereto.

7. The invention of claim 6 wherein the means for calculating the third signal includes the step of averaging multiple frames of output signals to acquire the first signal.

8. An automated system for testing a drivers thermal viewing sensor by evaluating the output thereof with respect to a known target, said system comprising:
   means for acquiring an output signal from the sensor in response to a known target, said output including signal S, random noise $N_R$ and fixed pattern noise $N_{FP}$;
   means for processing the sensor output signal to provide a first signal which includes essentially signal S and fixed pattern noise $N_{FP}$, a second signal which includes essentially random noise $N_R$ and a third signal which includes essentially fixed pattern noise $N_{FP}$, further including:
      means for setting the target to present a temperature differential to said sensor and calculating the second signal in response thereto and
      means for setting the target to present a zero degree temperature differential and calculating said third signal in response thereto;
   means for adaptively filtering said third signal to provide a filtered signal fixed pattern noise signal $N'_{FP}$;
   means for subtracting said filtered signal $N'_{FP}$ from the first signal to extract a signature S;
   means for processing said signature to acquire a modulation transfer function and a signal peak baseline therefrom; and
   means for processing the modulation transfer function, signal peak baseline and random noise signals to acquire a minimum resolvable temperature of said sensor.

9. The invention of claim 8 wherein the means for calculating the second signal includes means for averaging multiple frames of output signals to acquire the first signal and subtracting the first signal from the sensor output signal to acquire the second signal.

10. The invention of claim 9 wherein the means for calculating the third signal includes means for averaging multiple frames of output signals to acquire the first signal.

11. An automated method for testing a sensor by evaluating the output thereof with respect to a known target, said method including the steps of:
   acquiring an output signal from the sensor in response to a known target, said output including signature signal S, random noise $N_R$ and fixed pattern noise $N_{FP}$;
   processing the sensor output signal to provide a first signal which includes essentially signal S and fixed pattern noise $N_{FP}$, a second signal which includes essentially random noise $N_R$ and a third signal which includes essentially fixed pattern noise $N_{FP}$;
   adaptively filtering said third signal to provide a filtered signal fixed pattern noise signal $N'_{FP}$; and
   subtracting said filtered signal $N'_{FP}$ from the first signal to extract a signature S.

12. The invention of claim 11 further including the step of processing said signature to acquire a modulation transfer function and a signal peak baseline therefrom.

13. The invention of claim 12 further including the step of processing the modulation transfer function, signal peak baseline and random noise signals to acquire a minimum resolvable temperature of said sensor.

14. The invention of claim 11 wherein the step of processing the sensor output signal to provide first, second and third signals includes the step of setting the target to present a temperature differential to said sensor and calculating the second signal in response thereto.

15. The invention of claim 14 wherein the step of calculating the second signal includes the steps of averaging multiple frames of output signals to acquire the first signal and subtracting the first signal from the sensor output signal to acquire the second signal.

16. The invention of claim 14 wherein the step of processing the sensor output signal to provide first, second and third signals includes the step of setting the target to present a zero degree temperature differential and calculating said third signal in response thereto.

17. The invention of claim 16 wherein the step of calculating the third signal includes the step of averaging multiple frames of output signals to acquire the first signal.

18. An automated method for testing a drivers thermal viewing sensor by evaluating the output thereof with respect to a known target, said method including the steps of:

acquiring an output signal from the sensor in response to a known target, said output including signal S, random noise $N_R$ and fixed pattern noise $N_{FP}$;

processing the sensor output signal to provide a first signal which includes essentially signal S and fixed pattern noise $N_{FP}$, a second signal which includes essentially random noise $N_R$ and a third signal which includes essentially fixed pattern noise $N_{FP}$, including the steps of:

setting the target to present a temperature differential to said sensor and calculating the second signal in response thereto and setting the target to present a zero degree temperature differential and calculating said third signal in response thereto;

adaptively filtering said third signal to provide a filtered signal fixed pattern noise signal $N'_{FP}$;

subtracting said filtered signal $N'_{FP}$ from the first signal to extract a signature S;

processing said signature to acquire a modulation transfer function and a signal peak baseline therefrom;

processing the modulation transfer function, signal peak baseline and random noise signals to acquire a minimum resolvable temperature of said sensor.

19. The invention of claim 18 wherein the step of calculating the second signal includes the steps of averaging multiple frames of output signals to acquire the first signal and subtracting the first signal from the sensor output signal to acquire the second signal.

20. The invention of claim 19 wherein the step of calculating the third signal includes the step of averaging multiple frames of output signals to acquire the first signal.

* * * * *